(12) United States Patent
Few

(10) Patent No.: US 6,752,411 B2
(45) Date of Patent: Jun. 22, 2004

(54) MULTI-STAGE TORSION AXLE

(75) Inventor: Jeffrey P. Few, Elkhart, IN (US)

(73) Assignee: Norco Industries, Inc., Elkhart, IN (US)

( * ) Notice: Subject to any disclaimer, the term of this patent is extended or adjusted under 35 U.S.C. 154(b) by 0 days.

(21) Appl. No.: 10/283,521

(22) Filed: Oct. 30, 2002

(65) Prior Publication Data

US 2003/0234505 A1 Dec. 25, 2003

Related U.S. Application Data

(63) Continuation-in-part of application No. 10/178,096, filed on Jun. 24, 2002.

(51) Int. Cl.[7] .............................. B60G 3/04; B60G 11/23
(52) U.S. Cl. ...................... 280/124.169; 280/124.166; 280/124.167; 280/86.757; 280/124.134; 267/282; 267/279; 267/285
(58) Field of Search ................................. ; 280/124.137, 280/124.166, 124.169, 124.134, 124.167, 86.757; 267/279, 280–282, 292, 294, 276, 277, 273, 274, 285, 130, 188, 189; B60G 3/04, 11/23

(56) References Cited

U.S. PATENT DOCUMENTS

| | | | |
|---|---|---|---|
| 1,373,331 A | | 3/1921 | Hupp |
| 1,941,673 A | | 1/1934 | Fink |
| 2,051,864 A | * | 8/1936 | Knox et al. ................. 267/282 |
| 2,075,041 A | | 3/1937 | Kliesrath |
| 2,080,969 A | | 5/1937 | Macbeth |
| 2,088,341 A | | 7/1937 | Rabe |
| 2,148,029 A | | 2/1939 | Matthews |
| 2,216,455 A | | 10/1940 | Piron |
| 2,267,312 A | | 12/1941 | Smith |
| 2,712,742 A | | 7/1955 | Niedhart |
| 2,858,142 A | | 10/1958 | Schjolin et al. |
| 2,988,371 A | | 6/1961 | Allison |
| 2,998,241 A | | 8/1961 | Eyb |
| 3,113,769 A | | 12/1963 | Pryale |
| 3,243,007 A | | 3/1966 | Berckhan |
| 3,701,542 A | | 10/1972 | Grosseau |
| 3,770,291 A | * | 11/1973 | Kramer ................. 280/124.102 |
| 3,779,576 A | * | 12/1973 | Malcolm .................... 280/684 |
| 3,831,966 A | | 8/1974 | Grosseau |
| 4,027,899 A | | 6/1977 | Hawes et al. |
| 4,291,895 A | | 9/1981 | Wohrle et al. |
| 4,540,197 A | | 9/1985 | Finn et al. |
| 4,635,958 A | | 1/1987 | Yonemoto |
| 4,659,069 A | | 4/1987 | Odobasic |
| 4,738,467 A | | 4/1988 | Orndorff, Jr. et al. |
| 4,778,199 A | * | 10/1988 | Haggerty et al. ..... 280/124.102 |
| 4,781,364 A | | 11/1988 | Finn et al. |
| 4,848,789 A | | 7/1989 | Timoney et al. |
| 4,966,386 A | | 10/1990 | Werdich |
| 5,007,660 A | | 4/1991 | Orndorff, Jr. et al. |
| 5,161,818 A | | 11/1992 | Kopieczek |
| 5,215,328 A | | 6/1993 | Bono et al. |
| 5,277,450 A | | 1/1994 | Henschen |
| 5,303,907 A | | 4/1994 | Holzheimer |
| 5,411,287 A | | 5/1995 | Henschen |
| 5,709,605 A | | 1/1998 | Riefe et al. |
| 5,716,042 A | | 2/1998 | Derviller |
| 5,758,896 A | | 6/1998 | Cruise |
| 5,810,338 A | | 9/1998 | Koenig et al. |
| 5,816,606 A | | 10/1998 | Cruise et al. |
| 5,921,568 A | | 7/1999 | Cruise et al. |
| 6,019,384 A | | 2/2000 | Finck |
| 6,070,892 A | | 6/2000 | Noutomi et al. |
| 6,318,710 B1 | | 11/2001 | Anderson et al. |

* cited by examiner

Primary Examiner—Ruth Ilan
(74) Attorney, Agent, or Firm—Hahn Loeser & Parks LLP; W. Edward Crooks, Esq.; Michael H. Minns, Esq.

(57) ABSTRACT

A multi-stage torsion axle that has a first stage torsion assembly positioned within a second stage torsion assembly. The first stage torsion assembly has a square first stage shaft within a first elastomeric bushing. The second stage torsion assembly has a square tubular second stage shaft within a second elastomeric bushing, the second stage shaft fitting around the first stage torsion assembly. A hollow square tubular housing fits around the second stage assembly. The resilience of the first stage torsion assembly is less than the resilience of the second stage torsion assembly. A stop mechanism directly transfers torque from the first stage shaft to the second stage shaft when the first stage has rotated more than a predetermined amount relative to the second stage shaft.

35 Claims, 5 Drawing Sheets

MULTI-STAGE TORSION AXLE

This application is a continuation-in-part of co-pending application Ser. No. 10/178,096, filed Jun. 24, 2002, the disclosure of which is hereby incorporated by reference.

BACKGROUND OF THE INVENTION

This invention relates generally to vehicle suspension systems and more particularly to a multi-stage torsion axle, particularly for use with trailers.

In many instances, such as for boat trailers, horse trailers, utility trailers, both open and enclosed, and recreational trailers, the suspension system is designed to give an acceptable ride when the trailer is substantially loaded, but provide a poor and uncomfortably stiff ride when the trailer is very lightly loaded or has no load.

The foregoing illustrates limitations known to exist in present suspension systems Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a multi-stage torsion axle comprising: a first stage shaft; an elastomeric first stage bushing about the first stage shaft; a second stage shaft about the first stage bushing; an elastomeric second stage bushing about the second stage shaft; and an axle housing about the second stage bushing, the first stage shaft, the first stage bushing, the second stage shaft and the second stage bushing being collinear and coaxial.

In one embodiment of the present invention, two multi-stage torsion axles are used with one connecting arm attached to both multi-stage torsion axles and a wheel rotatably attached to the connecting arm, the axis of the wheel being 90° to the axis of the multi-stage torsion axles. In an alternate embodiment of the present invention, two multi-stage torsion axles are used with a connecting arm attached to each multi-stage torsion axle, each connecting arm having a wheel rotatably attached to the connecting arm.

In a preferred embodiment of the present invention, this is accomplished by providing a multi-stage torsion axle comprising: a rectangular first stage shaft; a plurality of circumferentially spaced apart first stage elastomeric members positioned about the first stage shaft; a hollow rectangular second stage shaft, the first stage shaft and the first stage elastomeric members being positioned therein, corners of the first stage shaft being offset 45° from the corners of the second stage shaft; a plurality of circumferentially spaced apart second stage elastomeric members positioned about the second stage shaft, resilience of the first stage elastomeric members being less than resilience of the second stage elastomeric members; a rectangular tubular axle housing about the second stage elastomeric members, corners of the second stage shaft being offset 45° from corners of the axle housing; and a stop mechanism directly transferring torque between the first stage shaft and the second stage shaft, when the first stage shaft has rotated more than a predetermined amount relative to the second stage shaft, the first stage shaft, the first stage elastomeric members, the second stage shaft and the second stage elastomeric members being collinear and coaxial.

In a second embodiment of the present invention, this is provided by a multi-stage torsion axle comprising: a resilient first stage torsion apparatus having a first stage shaft; a resilient second stage torsion apparatus surrounding the first stage torsion apparatus, the second stage torsion apparatus having a second stage shaft; and a stop mechanism directly transferring torque between the first stage shaft and the second stage shaft, when the first stage shaft has rotated more than a predetermined amount relative to the second stage shaft.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 2:
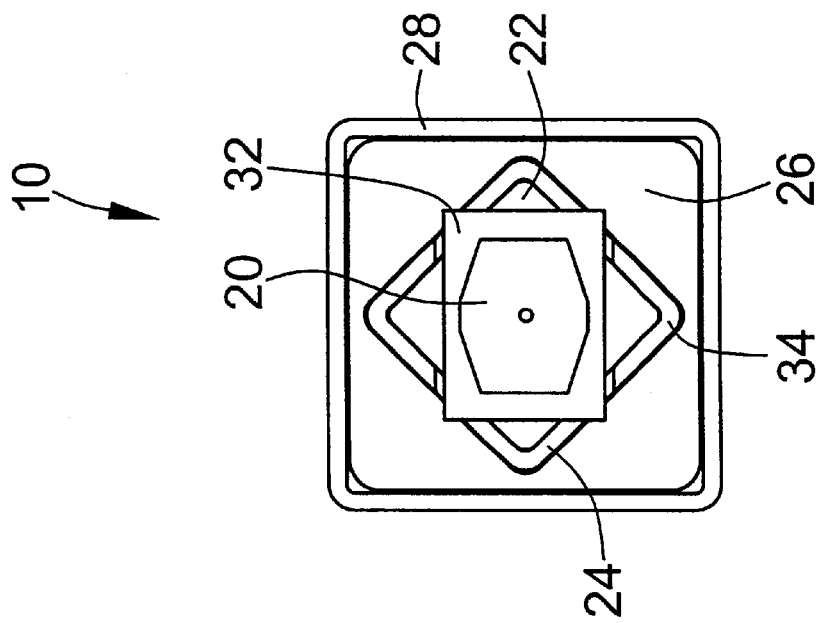
FIG. 2 is an end view of the multi-stage torsion axle shown in FIG. 1, showing single piece torsion bushings.
Figure 1:
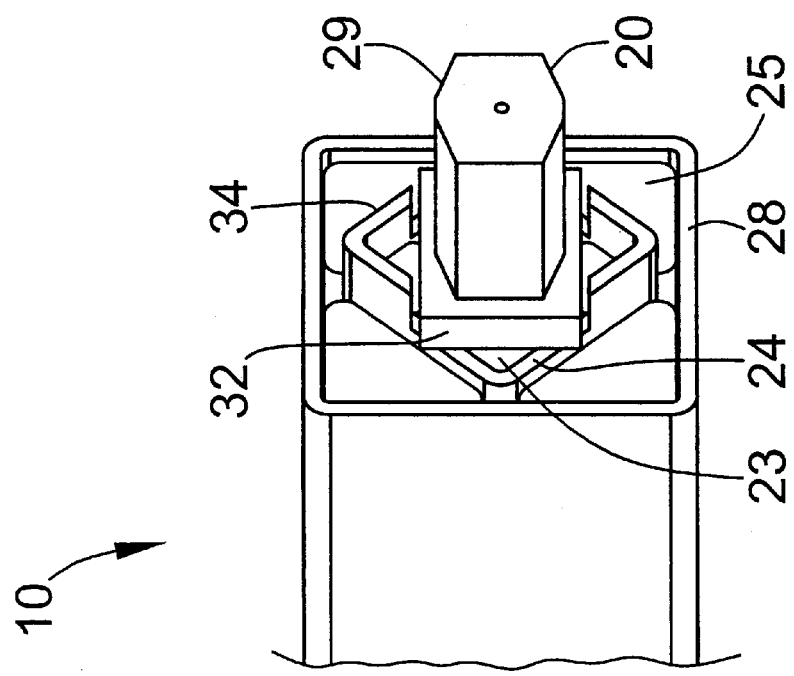
FIG. 1 is a perspective view of a multi-stage torsion axle according to the present invention.

The FIGURES show a multi-stage torsion axle 10 with a first stage torsion assembly 12 and a second stage torsion assembly 14 surrounded by a housing 28. The multi-stage torsion axle 10 is primarily used for trailers, such as smaller utility trailers towed by an automobile, a pick-up truck or a small truck, horse trailers, boat trailers, recreational vehicle trailers such as pop-up campers, conventional travel trailers and fifth wheel trailers. Preferably, the first stage torsion assembly 12 is active during low or no load conditions and the second stage torsion assembly 14 is active during normal load conditions.

The first stage torsion assembly 12 includes an axially extending first stage shaft 20 with a first stage elastomeric bushing 22 surrounding the first stage shaft 20. The second stage torsion assembly 14 surrounds the first stage torsion assembly 12 and includes an axially extending second stage shaft 24, which surrounds the first stage elastomeric bushing 22, with a second stage elastomeric bushing 26 surrounding the second stage shaft 24. Axle housing 28 surrounds the second stage elastomeric bushing 26. Preferably, first stage shaft 20, first stage bushing 22, second stage shaft 24, second stage bushing 26 and housing 28 are collinear and coaxial.

FIG. 2 shows an embodiment where the second stage bushing 26 and the first stage bushing 22 are formed from an elastomeric material that surrounds the second stage shaft 24 and the first stage shaft 20, respectively. Such unitary bushings could be formed in place or could be a single pre-formed bushing that is pressed into the multi-stage torsion axle 10. Preferably, the first stage bushing 22 consists of a plurality of separate elastomeric rods 23 circumferentially spaced about the first stage shaft 20 and the second stage bushing 26 consists of a plurality of separate elastomeric rods 25 circumferentially spaced about the second stage shaft 24.

Preferably, first stage shaft 20, second stage shaft 24 and housing 28 have a non-cylindrical shape and, most preferably, they have a rectangular shape or square shape. Cylindrical shapes could also be used. In the preferred embodiment, corners of the first stage shaft 20 are offset 45° from corners of the second stage shaft 24 and corners of the second stage shaft 24 are offset 45° from corners of housing 28. Other degrees of rotation offset could be used.

Multi-stage torsion axle 10 may include a stop mechanism that directly transfers torque from the first stage shaft 20 to the second stage shaft 24 when the first stage shaft 20 has rotated more than a pre-determined amount. In a preferred embodiment, this is accomplished by the first stage shaft 20 having a radially extending flange 32 and the second stage shaft 24 having an axially extending flange 34. When first stage shaft 20 rotates a pre-determined amount, relative to second stage shaft 24, an edge of the first stage shaft stop flange 32 contacts an edge of the second stage shaft stop flange 34 and any further rotation of the first stage shaft 20 then directly rotates the second stage shaft 24. As a result, the first stage torsion assembly 12 is active up to a pre-determined rotation of the first stage shaft 20 and the second stage torsion assembly 14 is active thereafter as first stage shaft 20 continues to rotate. Alternatively, the second stage shaft 24 could have a radially extending stop flange and the first stage shaft 20 could have an axially extending stop flange, both shafts could have radially extending stop flanges or both shafts could have axially extending stop flanges. If one shaft had a rectangular shape and the other shaft had a square shape, the stop mechanism consists of one shaft contacting the other shaft when the first shaft has rotated a pre-determined amount relative to the second shaft.

The first shaft 20 has a connecting arm fitting 29 on one end for attachment of a connecting arm 40 that extends radially from the axis of first shaft 20. A rotatable wheel 46 is attached to a wheel spindle 42 that is attached to the free end of connecting arm 40.

In operation, as the vehicle or trailer travels down the road, wheel 46 will move up and down relative to the multi-stage torsion axle 10 in response to movement of the vehicle, changes in the road, such as bumps, holes, etc. This vertical movement of wheel 46 is translated into rotational movement of first shaft 20 by the radial offset of connecting arm 40. In prior art torsion axles, in the unloaded or low load condition, the elastomeric properties of the elastomeric bushing are so stiff, vertical movement of a wheel results in vertical movement of the vehicle or trailer rather than rotational movement of the torsion shaft. In the present invention, the resilience of the first stage torsion assembly 12 is selected so that first stage shaft 20 will rotate under unloaded or low load conditions, thereby absorbing some of the vertical movement and reducing the vertical movement of the trailer. As the load of the trailer increases, it becomes desirable for the second stage torsion assembly 14 to be active, or, in other words, for second stage shaft 24 to being rotating. This can be accomplished by allowing the first stage elastomeric bushing 22 to become fully compressed between the first stage shaft 20 and the second stage shaft 24. After complete compression of first stage elastomeric bushing 22, further rotation of first stage shaft 20 will cause rotation of second stage shaft 24. Preferably, a stop mechanism, such as stop flanges 32, 34, is provided, so that torque, resulting from vertical movement of wheel 46, is then transferred directly between first stage shaft 20 and second stage shaft 24.

For multi-stage torsion axles 10 where the first stage torsion assembly 12 is designed for the unloaded or low load condition, the resilience of the first stage torsion assembly 12 is less than the resilience of the second stage torsion assembly 14. The resilience of the two torsion assemblies 12, 14 is dependent upon the elastomeric properties and the size and shape of the elastomeric bushings 22, 26 or the elastomeric rods or members 23, 25. The lower resilience of the first stage assembly 12 could use an elastomer that is actually stiffer than the elastomer used in second stage assembly 14.

Figure 3:
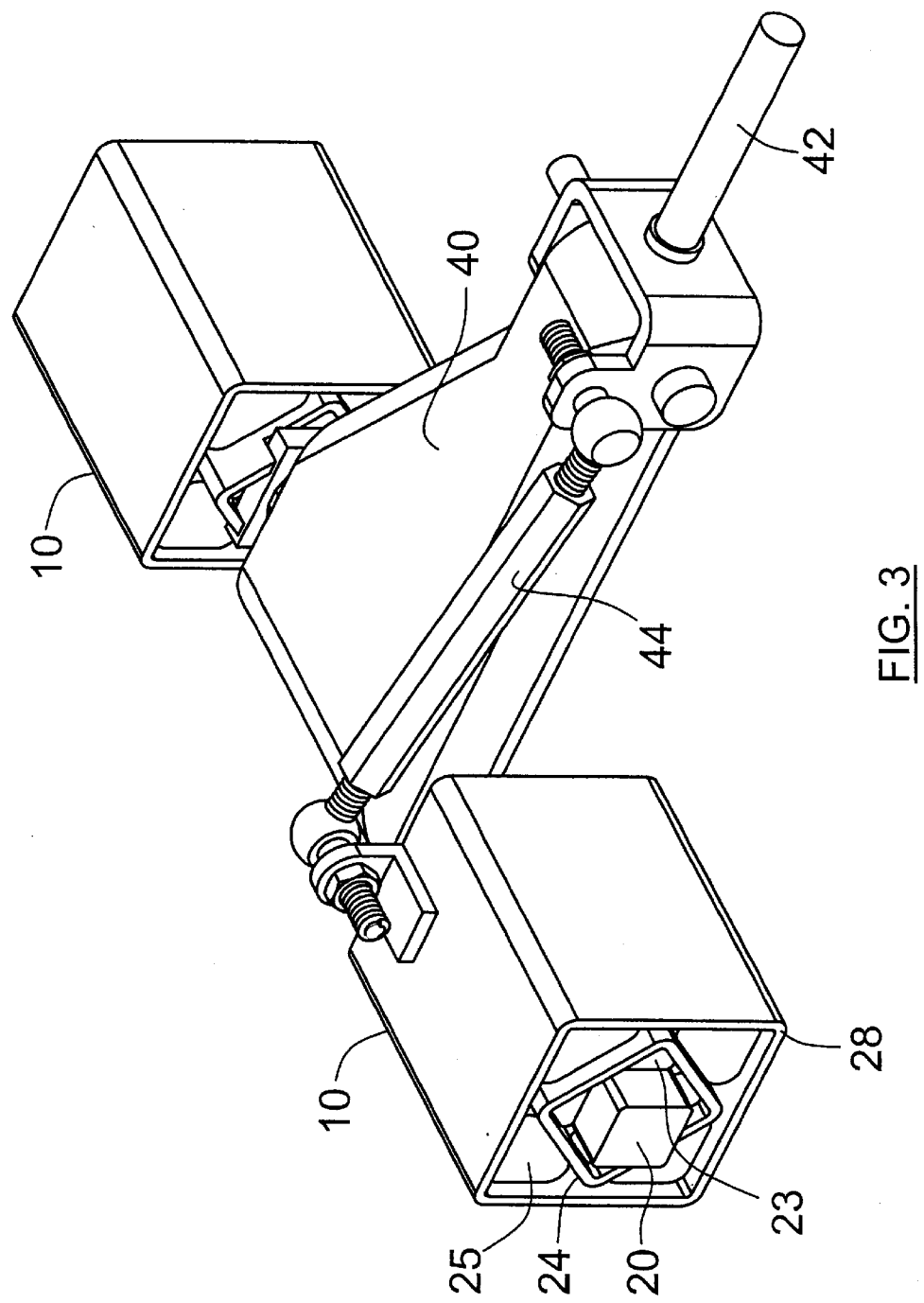
FIG. 3 is a perspective view of an application of the multi-stage torsion axle shown in FIG. 1.
Figure 4:
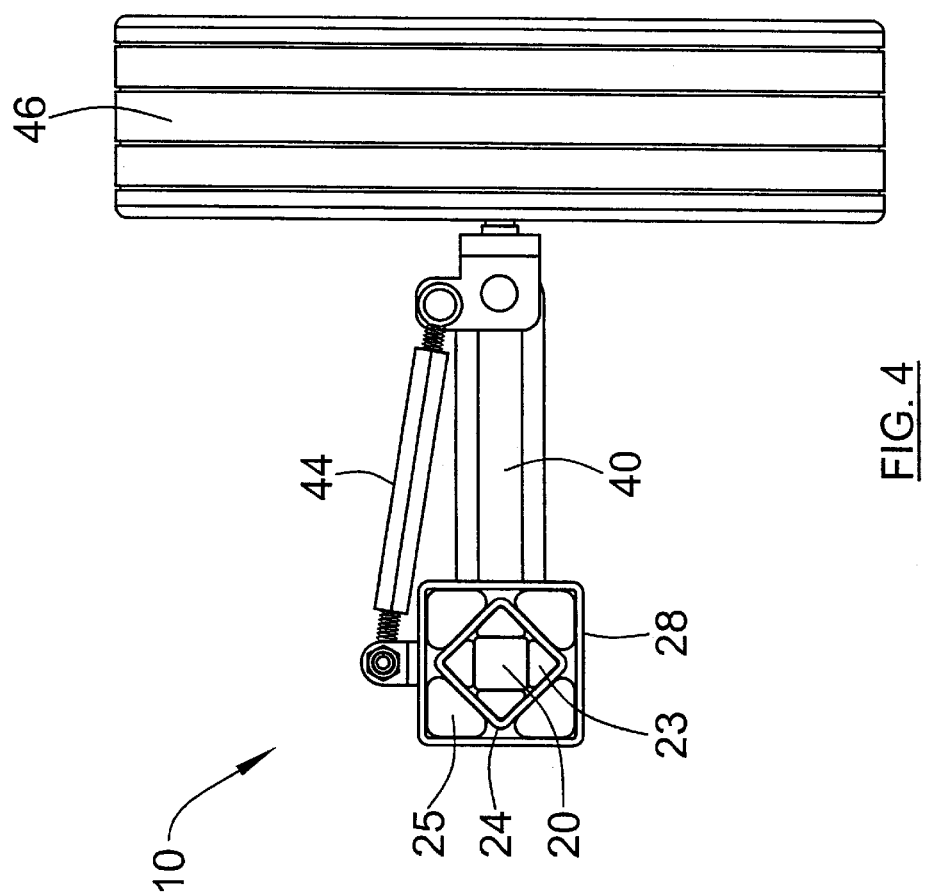
FIG. 4 is an end view of the application shown in FIG. 3.

One application of the multi-stage torsion axle 10 is shown in FIGS. 3 and 4. In this application, two multi-stage torsion axles 10 are used with the shafts 20, 24 of the multi-stage torsion axles 10 extending parallel to the direction of travel of the vehicle. In this application, a single connecting arm 40 is positioned between both multi-stage torsion axles 10 and is connected to both first stage shafts 20. Wheel spindle 42 is pivotally connected to connecting arm 40 and the wheel 46 rotates about an axis that is perpendicular to the axis of shafts 20, 24. An adjusting arm 44 is connected to one axle housing 28 and to wheel spindle 42 to allow vertical adjustment of wheel spindle 42.

Figure 5:
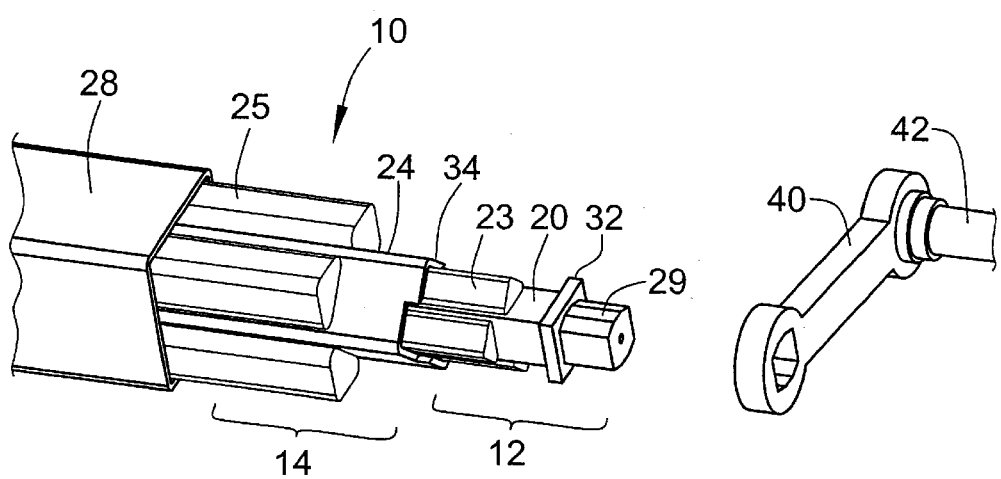
FIG. 5 is a perspective view of a second application of the multi-stage torsion axle shown in FIG. 1, showing the internal components axially spaced apart.
Figure 6:
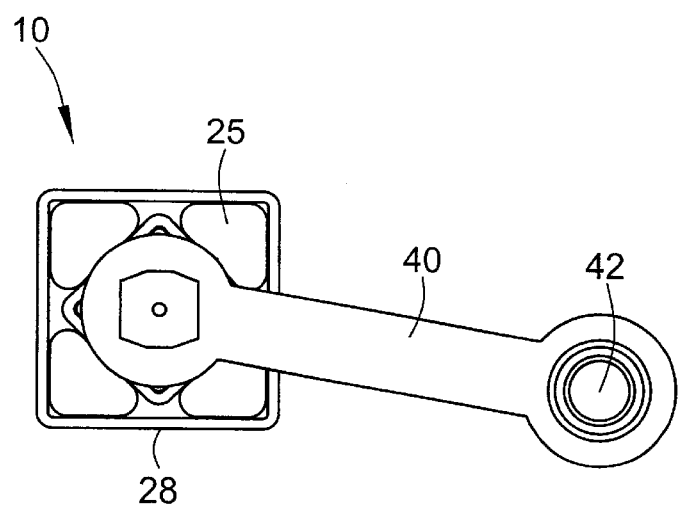
FIG. 6 is an end view of the application shown in FIG. 5.
Figure 7:
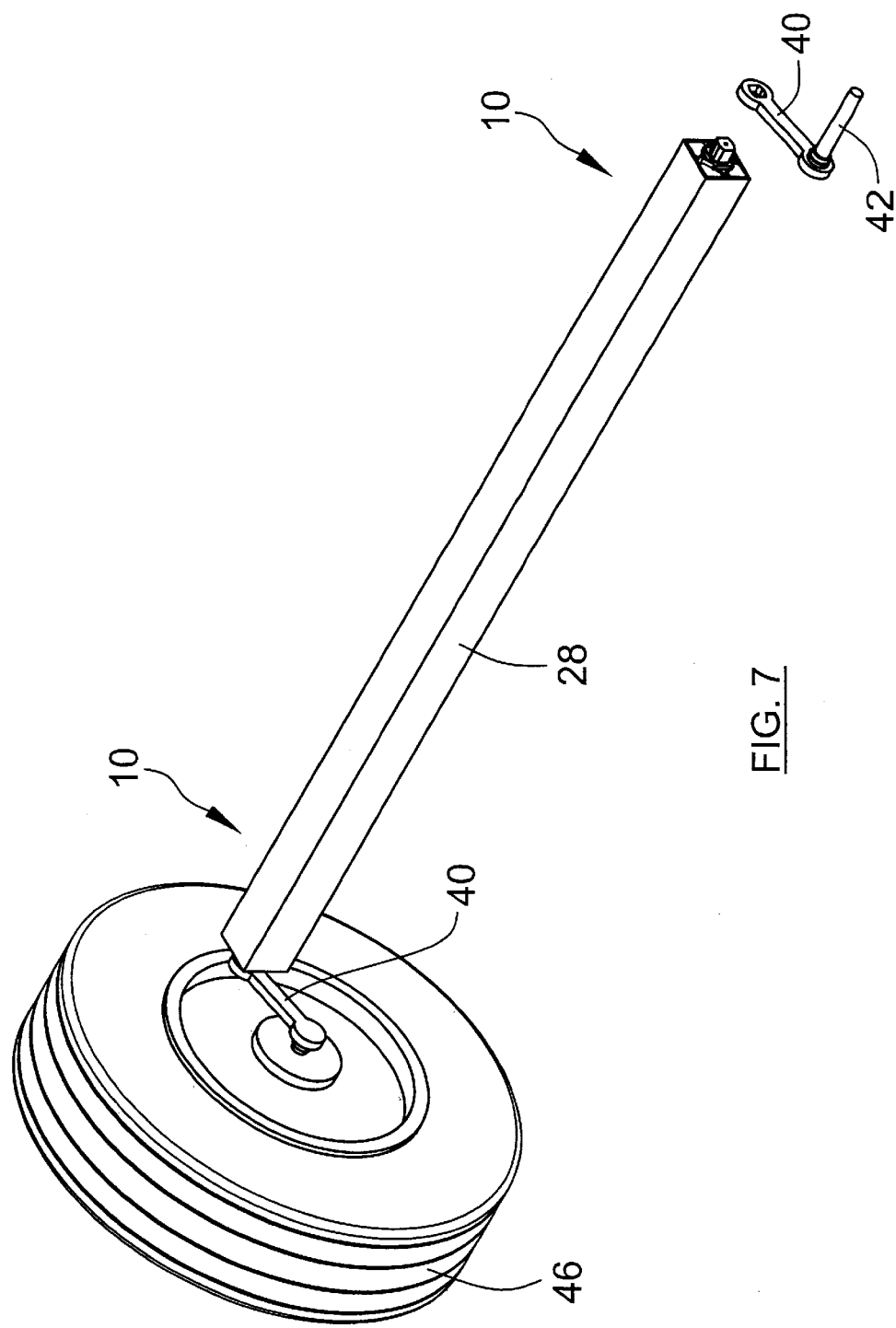
FIG. 7 is a second perspective view of the application shown in FIG. 5 with a wheel attached to one end of a multi-stage torsion axle housing.

A second application of the multi-stage torsion axle 10 is shown in FIGS. 5 through 7. In this second application, two multi-stage torsion axles 10 are used with the shafts 20, 24 of the multi-stage torsion axles 10 extending perpendicular to the direction of travel of the trailer. In this application, each multi-stage torsion axle 10 has a connecting arm 40 attached to first stage shaft 20. Wheel spindle 42 is attached to the end of connecting arm 40 and wheel 46 rotates about an axis that is parallel to the axis of shafts 20, 24. Axle housing 28 of one multi-stage torsion axle 10 is unitary with the axle housing 28 of the other multi-stage torsion axle 10 and extends from one side of the vehicle or trailer to the other side.

Having described the invention, what is claimed is:

1. A multi-stage torsion axle comprising:
   a first stage shaft;
   an elastomeric first stage bushing about the first stage shaft;
   a second stage shaft about the first stage bushing;
   an elastomeric second stage bushing about the second stage shaft; and
   an axle housing about the second stage bushing,
   the first stage shaft, the first stage bushing, the second stage shaft and the second stage bushing being collinear and coaxial, and
   a stop mechanism directly transferring torque between the first stage shaft and the second stage shaft, when the first stage shaft has rotated more than a predetermined amount relative to the second stage shaft.

2. The multi-stage torsion axle according to claim 1, wherein the stop mechanism comprises a portion of the first stage shaft contacting a portion of the second stage shaft.

3. The multi-stage torsion axle according to claim 2, wherein the first stage shaft has a first flange extending therefrom and the second stage shaft has a second flange extending therefrom, the stop mechanism comprising the first flange contacting the second flange.

4. The multi-stage torsion axle according to claim 3, one of the first flange and the second flange extends axially and the other of the first flange and the second flange extends radially.

5. The multi-stage torsion axle according to claim 1, wherein the elastomeric first stage bushing comprises a plurality of circumferentially spaced apart first stage elastomeric members.

6. The multi-stage torsion axle according to claim 1, wherein the elastomeric second stage bushing comprises a plurality of circumferentially spaced apart second stage elastomeric members.

7. The multi-stage torsion axle according to claim 1, wherein the second stage shaft is hollow, the first stage bushing and the first stage shaft being positioned therein.

8. The multi-stage torsion axle according to claim 7, wherein the first stage shaft, the second stage shaft and the axle housing each have a non-cylindrical shape.

9. The multi-stage torsion axle according to claim 7, wherein the second stage axle hollow shaft comprises a square hollow shaft, the axle housing comprises a square tubular member, corners of the second stage shaft being offset 45° from corners of the axle housing.

10. The multi-stage torsion axle according to claim 9, wherein the first stage shaft comprises a square rod member, corners of the first stage shaft being offset 45° from the corners of the second stage shaft.

11. The multi-stage torsion axle according to claim 1, further comprising:
a connecting arm connected to the first stage shaft and extending radially away from the first stage shaft.

12. The multi-stage torsion axle according to claim 11, further comprising:
a wheel rotatably connected to the connecting arm.

13. The multi-stage torsion axle according to claim 12, wherein the axis of the first stage shaft is parallel to an axis of rotation of the wheel.

14. The multi-stage torsion axle according claim 12, wherein the axis of the first stage shaft is perpendicular to an axis of rotation of the wheel.

15. The multi-stage torsion axle according to claim 1, wherein resilience of the elastomeric first stage bushing is different than resilience of the second stage bushing.

16. The multi-stage torsion axle according to claim 1, wherein resilience of the elastomeric first stage bushing is less than resilience of the elastomeric second stage bushing.

17. In combination:
a first multi-stage torsion axle according to claim 1;
a second multi-stage torsion axle according to claim 1;
a connecting arm positioned between the first multi-stage torsion axle and the second multi-stage torsion axle and being connected to both first stage shafts, the connecting arm extending radially away from both first stage shafts, both first stage shafts being coaxial with one another; and
a wheel rotatably attached to the connecting arm, the axes of the first stage shafts being perpendicular to an axis of rotation of the wheel.

18. The multi-stage torsion axle according to claim 17, wherein the first multi-stage torsion axle and the second multi-stage torsion axle each have a stop mechanism directly transferring torque between the first stage shaft and the second stage shaft, when the first stage shaft has rotated more than a predetermined amount relative to the second stage shaft.

19. The multi-stage torsion axle according to claim 17, wherein resilience of the elastomeric first stage bushing of one multi-stage torsion axle is less than resilience of the elastomeric second stage bushing of said one multi-stage torsion axle.

20. In combination:
a first multi-stage torsion axle according to claim 1;
a second multi-stage torsion axle according to claim 1;
two connecting arms, each first stage shaft having a connecting arm attached thereto;
a wheel rotatably attached to each connecting arm,
the axle housing of one multi-stage torsion axle being unitary with the axle housing of the other multi-stage torsion, the axes of the first stage shafts being parallel to axes of rotation of the wheels.

21. The multi-stage torsion axle according to claim 20, wherein the first multi-stage torsion axle and the second multi-stage torsion axle each have a stop mechanism directly transferring torque between the first stage shaft and the second stage shaft, when the first stage shaft has rotated more than a predetermined amount relative to the second stage shaft.

22. The multi-stage torsion axle according to claim 20, wherein resilience of the elastomeric first stage bushing of one multi-stage torsion axle is less than resilience of the elastomeric second stage bushing of said one multi-stage torsion axle.

23. A multi-stage torsion axle comprising:
a rectangular first stage shaft;
a plurality of circumferentially spaced apart first stage elastomeric members positioned about the first stage shaft;
a hollow rectangular second stage shaft, the first stage shaft and the first stage elastomeric members being positioned therein, corners of the first stage shaft being offset 45° from corners of the second stage shaft;
a plurality of circumferentially spaced apart second stage elastomeric members positioned about the second stage shaft, resilience of the first stage elastomeric members being less than resilience of the second stage elastomeric members;
a rectangular tubular axle housing about the second stage elastomeric members, the corners of the second stage shaft being offset 45° from corners of the axle housing; and
a stop mechanism directly transferring torque between the first stage shaft and the second stage shaft, when the first stage shaft has rotated more than a predetermined amount relative to the second stage shaft,
the first stage shaft, the first stage elastomeric members, the second stage shaft and the second stage elastomeric members being collinear and coaxial.

24. A multi-stage torsion axle comprising:
a resilient first stage torsion apparatus having a first stage shaft;
a resilient second stage torsion apparatus surrounding the first stage torsion apparatus, the second stage torsion apparatus having a second stage shaft; and
a stop mechanism directly transferring torque between the first stage shaft and the second stage shaft, when the first stage shaft has rotated more than a predetermined amount relative to the second stage shaft.

25. The multi-stage torsion axle according to claim 24, wherein the second stage shaft comprises a hollow shaft, the first stage torsion apparatus being positioned therein.

26. The multi-stage torsion axle according to claim 24, wherein the stop mechanism comprises a portion of the first stage shaft contacting a portion of the second stage shaft.

27. The multi-stage torsion axle according to claim 24, wherein resilience of the first stage torsion apparatus is less than resilience of the second stage torsion apparatus.

28. The multi-stage torsion axle according to claim 29, wherein the first stage torsion apparatus comprises an elastomeric first stage bushing about the first stage shaft, the first stage bushing resisting rotation of the first stage shaft.

29. The multi-stage torsion axle according to claim 28, wherein the elastomeric first stage bushing comprises a plurality of circumferentially spaced apart first stage elastomeric members.

30. The multi-stage torsion axle according to claim 24, wherein the second stage torsion apparatus comprises an elastomeric second stage bushing about the second stage shaft, the second stage bushing resisting rotation of the second stage shaft.

31. The multi-stage torsion axle according to claim 30, wherein the elastomeric second stage bushing comprises a plurality of circumferentially spaced apart second stage elastomeric members.

32. The multi-stage torsion axle according to claim 24, comprising a housing surrounding the first stage torsion apparatus and the second stage torsion apparatus.

33. The multi-stage torsion axle according to claim 32, wherein the first stage torsion apparatus, the second stage torsion apparatus and the housing are coaxial and collinear.

34. The multistage torsion axle according to claim 33, wherein the first stage shaft has a rectangular cross-sectional shape, the second stage shaft is a hollow rectangular tubular member, and the housing is a rectangular tubular member, corners of the first stage shaft being offset 45° from the corners of the second stage shaft, and corners of the second stage shaft being offset 45° from corners of the housing.

35. A torsion axle having a first stage and a second stage, each stage comprising a shaft and an elastomeric bushing about the shaft, one stage being substantially concentrically outward of the other stage, the torsion axle comprising:

a stop mechanism directly limiting relative rotation between the first stage shaft and the second stage shaft when the first stage shaft has rotated more than a predetermined amount relative to the second stage shaft.

\* \* \* \* \*